United States Patent
Lucas-Woodley et al.

(10) Patent No.: US 9,286,692 B2
(45) Date of Patent: Mar. 15, 2016

(54) SYSTEM AND METHOD OF BOOK LEAF TRACKING

(71) Applicant: Sony Computer Entertainment Europe Limited, London (GB)

(72) Inventors: Thomas Lucas-Woodley, London (GB); Nicholas Andrew Lord, London (GB); William Oliver Sykes, London (GB); Adrien Bain, London (GB)

(73) Assignee: Sony Computer Entertainment Europe Limited (GB)

( * ) Notice: Subject to any disclaimer, the term of this patent is extended or adjusted under 35 U.S.C. 154(b) by 127 days.

(21) Appl. No.: 13/875,745

(22) Filed: May 2, 2013

(65) Prior Publication Data

US 2013/0301878 A1    Nov. 14, 2013

(30) Foreign Application Priority Data

May 11, 2012 (GB) .................................. 1208264.0

(51) Int. Cl.
*G06T 7/20* (2006.01)
*G06T 7/00* (2006.01)

(52) U.S. Cl.
CPC ............. *G06T 7/2033* (2013.01); *G06T 7/0044* (2013.01); *G06T 2207/10016* (2013.01); *G06T 2207/30176* (2013.01); *G06T 2207/30208* (2013.01)

(58) Field of Classification Search
None
See application file for complete search history.

(56) References Cited

U.S. PATENT DOCUMENTS

| 8,934,664 | B2 * | 1/2015 | Raghoebardayal | G06T 7/004 382/100 |
| 2006/0262962 | A1 * | 11/2006 | Hull | G06F 17/30247 382/103 |
| 2010/0092079 | A1 * | 4/2010 | Aller | G06K 9/3216 382/165 |
| 2012/0081394 | A1 * | 4/2012 | Campbell | G06T 7/0044 345/633 |
| 2012/0223968 | A1 * | 9/2012 | Kashimoto | G06T 11/00 345/633 |
| 2013/0201185 | A1 * | 8/2013 | Kochi | G06F 3/011 345/419 |
| 2013/0301878 | A1 * | 11/2013 | Lucas-Woodley et al. | ... 382/103 |

FOREIGN PATENT DOCUMENTS

EP        2426641 A1    3/2012
KR   20110091126 A    8/2011

OTHER PUBLICATIONS

Farbiz F, Cheok AD, Zhou Z, et al. "Live three-dimensional content for augmented reality." IEEE Trans Multimedia. vol. 7, No. 3, pp. 514-523, Jun. 2005.*

Partial European Search report for Application No. 13152016 dated Oct. 18, 2013.

(Continued)

*Primary Examiner* — Matthew Bella
*Assistant Examiner* — Soo Shin
(74) *Attorney, Agent, or Firm* — Lerner, David, Littenberg, Krumholz & Mentlik, LLP

(57) ABSTRACT

A method of book leaf tracking comprises receiving a video image comprising a book, estimating the current position and orientation of the book within the video image in response to a fiduciary marker of the book visible in the image, estimating the visibility of one or more predetermined features of the book, calculating a range of leaf turning angles that is consistent with the detected visibility of the or each predetermined feature of the book for the estimated current position and orientation of the book, and estimating the angle of a turning leaf of the book responsive to the calculated range.

16 Claims, 11 Drawing Sheets

(56) References Cited

OTHER PUBLICATIONS

Extended European Search Report for Application No. 12196280 dated Oct. 11, 2013.
Feng Zhou et al: "Trends in augmented reality tracking, interaction and display: A review of ten years of ISMAR", Mixed and Augmented Reality, 2008. ISMAR 2008. 7th IEEE/ACM International Symposium on, IEEE, Piscataway, NJ, USA, Sep. 15, 2008, pp. 193-202, XP031344009.
Grasset R et al: "The design of a mixed-reality book: Is it still a real book?", Mixed and Augmented Reality, 2008. ISMAR 2008. 7th IEEE/ACM International Symposium on, IEEE, Piscataway, NJ, USA, Sep. 15, 2008, pp. 99-102, XP031343982.
Hyun S Yang et al: "Hybrid Visual Tracking for Augmented Books", Sep. 25, 2008, Entertainment Computing-ICEC 2008; [Lecture Notes in Computer Science], Springer Berlin Heidelberg, Berlin, Heidelberg, pp. 161-166, XP019109852.
Kyusung Cho et al: "A Realistic E-Learning System based on Mixed Reality", Proc 13th Intl Conference on Virtual Systems and Multimedia, Sep. 23, 2007, pp. 57-64, XP055081387.
Extended European Search Report for Application No. 13160681 dated Sep. 9, 2013.
Fiala M: "Comparing ARTag and ARToolkit plus fiducial marker systems", Haptic Audio Visual Environments and Their Applications, 2005 IREE International Worksho on Oct. 1, 2885, Piscataway, NJ, USA, IEEE, Oct. 1, 2005, pp. 147-152, XP010858685.
Gun A. Lee et al: "Occlusion based interaction methods for tangible augmented reality environments", Proceedings of the 2004 ACM SIGGRAPH International Conference on Virtual Reality Continuum and Its Applications in Industry, VRCAI '04, Jan. 1, 2004, p. 419-426, XP055005457.
Shilpi Gupta et al: "The universal media book: tracking and augmenting moving surfaces with projected information", Mixed and Augmented Reality, 2006. ISMAR 2006. IEEE/ACM International Symposium on, IEEE, PI, Oct. 1, 2006, pp. 177-180, XP031014667.
H.S. Yang et al., "Multiple Page Recognition and Tracking for augmented Books", (Eds.): ICEC 2010, LNCS 6243, pp. 127-138 (See especially Section 3.2, Page Tracking Process).
Search Report dated Sep. 12, 2012 for Appliction No. GB1208264.0.

\* cited by examiner

SYSTEM AND METHOD OF BOOK LEAF TRACKING

CROSS REFERENCE TO RELATED APPLICATIONS

The present application claims the benefit of and priority to GB Application No. 1208264.0, filed May 11, 2012, the entire disclosure of which is incorporated by reference herein.

BACKGROUND OF THE INVENTION

1. Field of the Invention

The present invention relates to a system and method of book leaf tracking.

2. Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 metre).

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of the colour found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

In a first aspect, a method of book leaf tracking is provided in accordance with claim 1.

In another aspect, an entertainment device is provided in accordance with claim 12.

In another aspect, a system for book leaf tracking is provided in accordance with claim 13.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of book leaf tracking are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1:
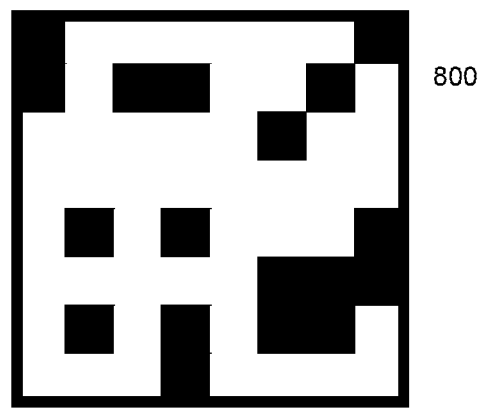
FIG. 1 is a schematic diagram of a fiduciary marker in accordance with an embodiment of the present invention.
Figure 2A:
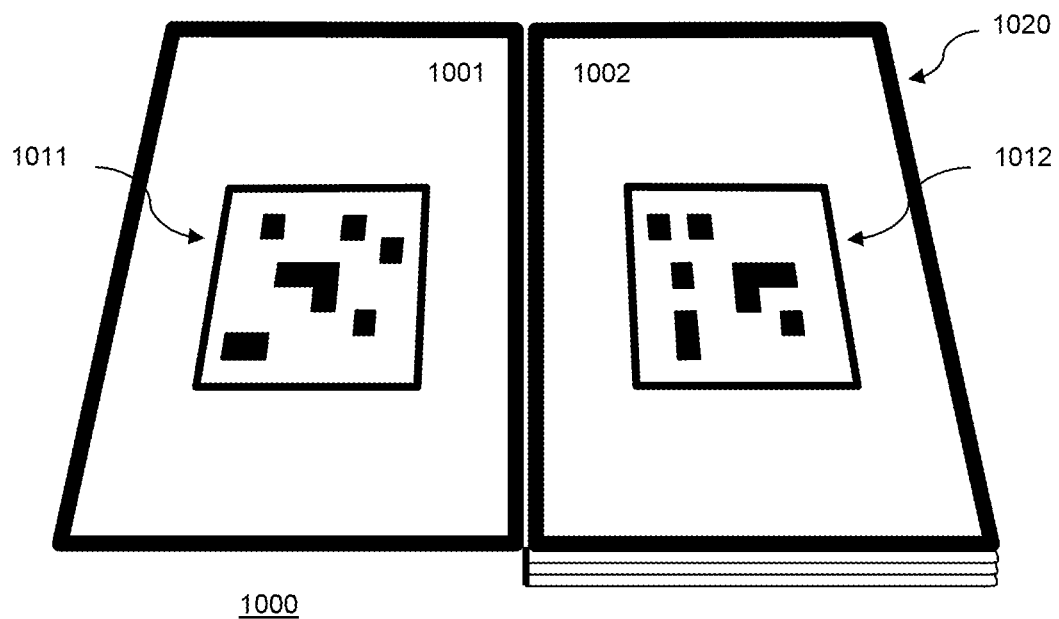
FIG. 2A is a schematic diagram of a book comprising a fiduciary marker, in accordance with an embodiment of the present invention.
Figure 2B:
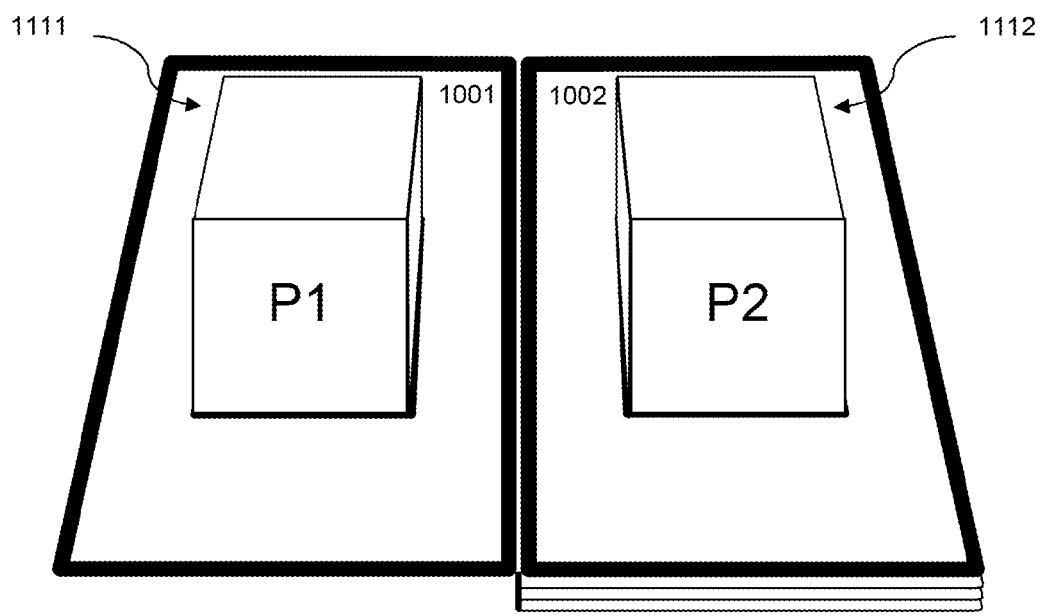
FIG. 2B is a schematic diagram of an image of a book augmented in accordance with an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with virtual graphic elements 1111, 1112 corresponding to the placement, scale and orientation of the fiduciary markings 1011, 1012 on the visible pages, and output the augmented video image for display. In this way the displayed version of the book becomes a 'magic' pop-up book in which the pages can come to life.

Figure 3:
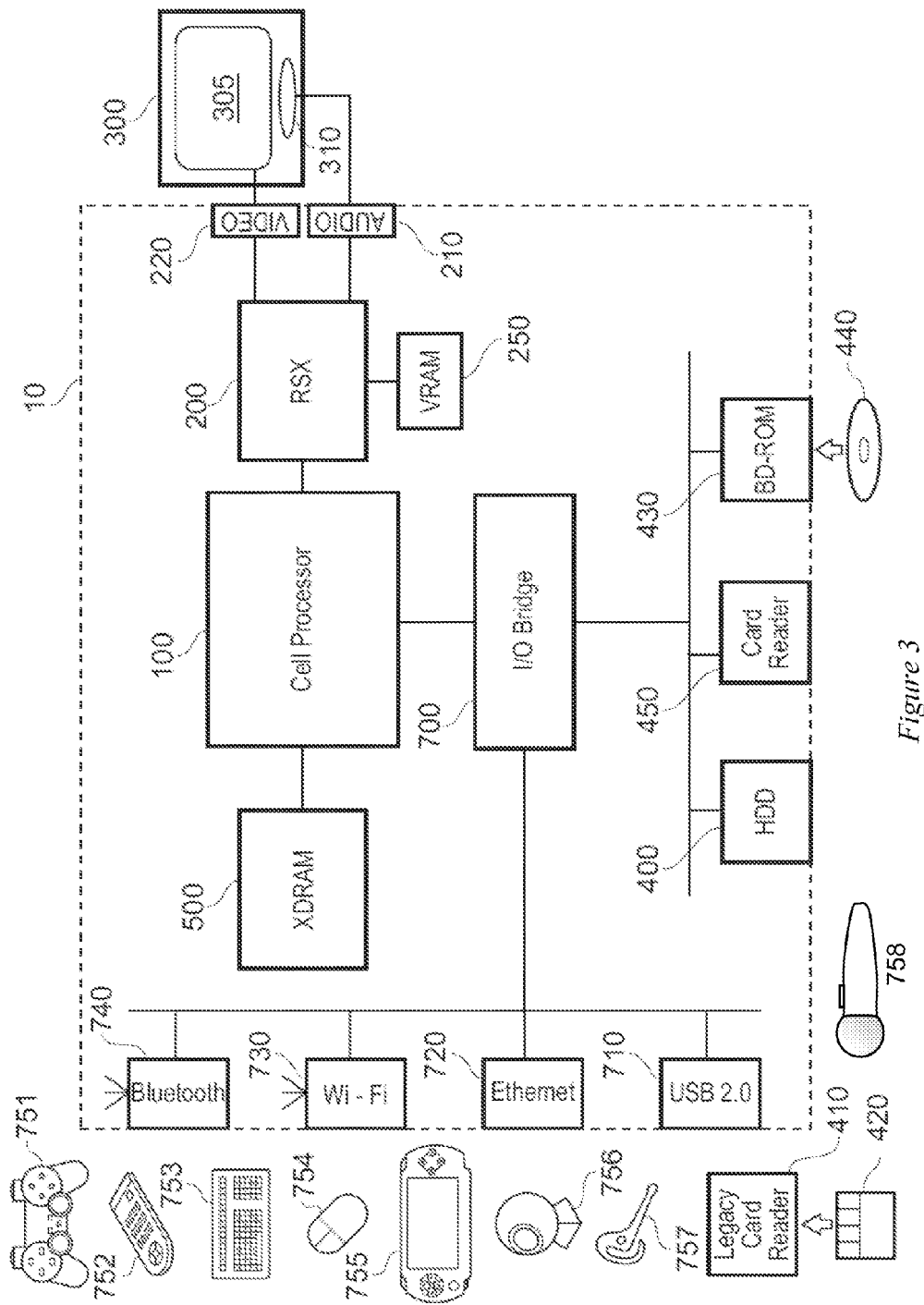
FIG. 3 is a schematic diagram of an entertainment device in accordance with an embodiment of the present invention.

FIG. 3 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly. The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment to device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 to device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
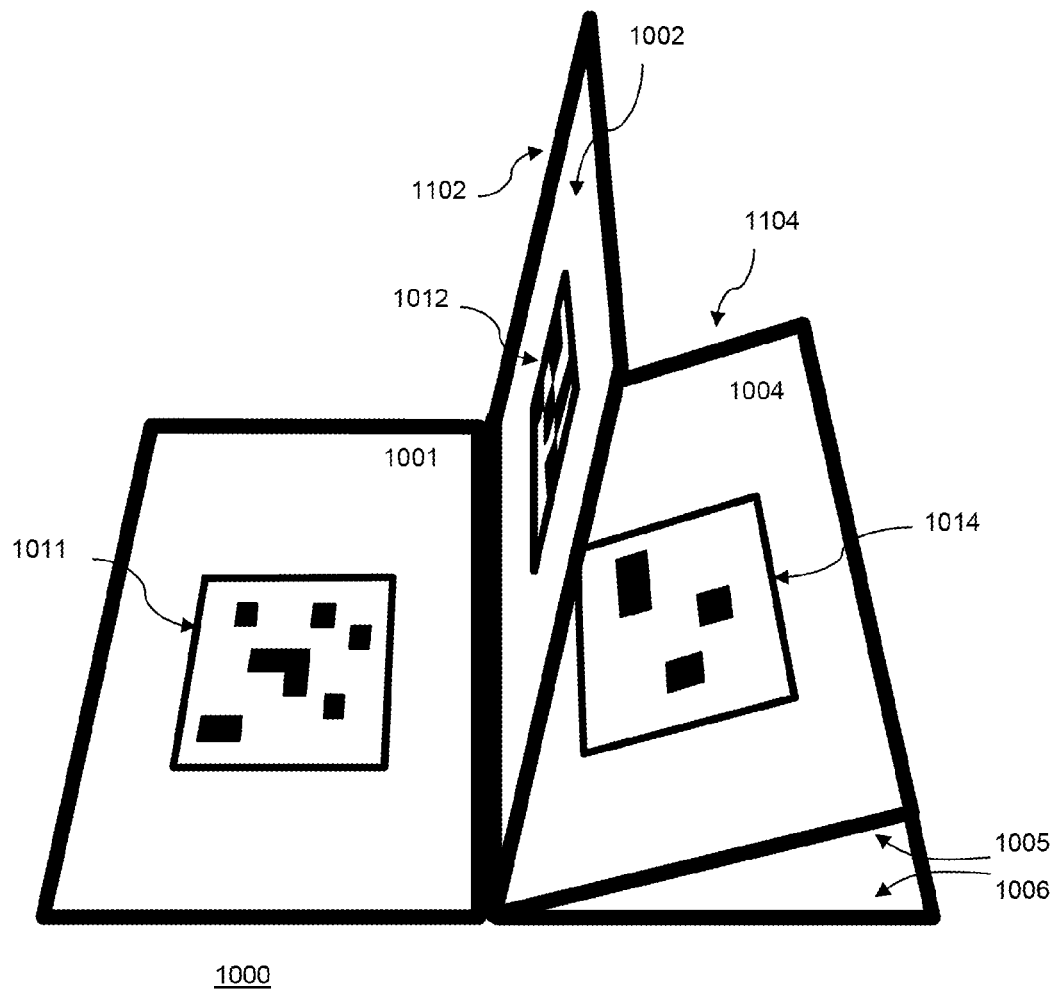
FIG. 4 is a schematic diagram of a book comprising a fiduciary marker, in accordance with an embodiment of the present invention.

Referring now to FIG. 4, it will be appreciated that whilst the fiduciary markers may be readily detected when the book is laid open and flat, problems may arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a problem that arises is that during the process of turning these pages there comes a point where the fiduciary marker 1012 on page 2 (for example) becomes so distorted by being viewed nearly edge-on to the camera that it is no longer recognisable by the entertainment to device. At this point it becomes preferable to use an alternative technique of determining the position of the turning leaf of the book so that any animations dependent upon it (for example a pop-up animation showing objects between pages 1 and 2 folding down, or unfolding between pages 3 and 4) are able to continue appropriately.

Such a technique is described in co-pending European application 10175548.6, incorporated herein by reference. A brief summary of the technique is described below with reference to FIG. 5.

In a first step s10, a scene comprising the book is captured by a video camera or similar image capture device operably coupled to an image input of the PS3 (such as a USB port), resulting in an image including the book. As noted previously, the book itself comprises substantially rigid leaves.

In a second step s20, the PS3 attempts to detect fiduciary markings in the image (i.e. those visible in the book), for example using the Cell processor operating under suitable software instruction as a marking detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts at the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof, as may the dimensions of the book and the expected positions of the markers therein.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Thus as a non-limiting example, hypotheses for page positions in the range 10 to 170 degrees may be generated at increments of 4 degrees. Again here the Cell processor may operate as the hypothesising means.

To provide a basis of comparison with these hypotheses, in a fifth step s50 the captured image is processed to generate an image in which edges are identified. In addition data indicating the directions of these edges can be generated. The image processing may be performed by the to Cell processor, the Reality Synthesiser graphics unit or a combination of the two.

In a sixth step s60, the hypothesised edges of the turning leaf of the book are each evaluated with respect to the image comprising the identified edges and optionally the directions of these edges using one of several possible scoring criteria, such as a distance-based criterion that generates a score proportional to how close an identified edge is to a hypothesised edge. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position and orientation consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Figure 5:
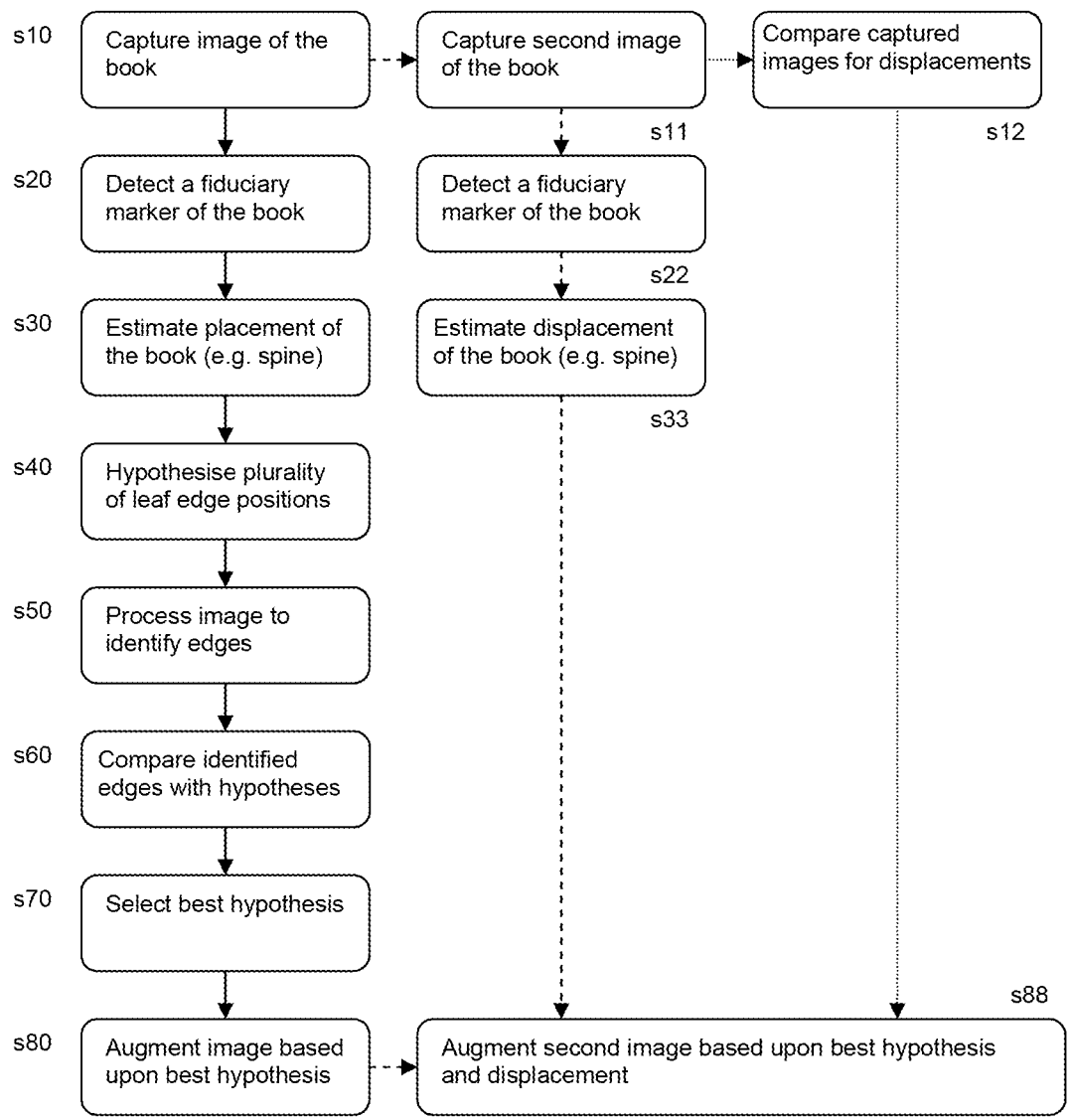
FIG. 5 is a flow diagram of a method of tracking the turning of a leaf of the book, in to accordance with an embodiment of the present invention.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor. In either case, this enables 3D augmentation for a stereoscopic display.

It will be appreciated that the above steps need not necessarily all be implemented in the above order. For example, the fifth step s50 may occur immediately after the first step s10.

It will also be appreciated that the initial hypothesis set may be distributed in a non-linear fashion, with a higher density of hypotheses near an expected position for the turning leaf (e.g. as predicted from the rate of turn in the last N video frames). Similarly within the selected range a number of prime hypotheses (such as the previously wining hypothesis from the previous frame) may be made the centre of a higher density of hypotheses.

However, it will be appreciated that the above technique may experience problems in some circumstances, such as when a leaf is turned very quickly resulting in motion blur and consequently limited edge data in the video image, or when strong shadows from the turning leaf create false-positive edges in the image.

To mitigate these problems, in an embodiment of the present invention the Cell processor under suitable software instruction implements a visibility constraint model for the range of allowable possible positions of the turning leaf that are hypothesised in the method of FIG. 5. This visibility constraint model helps to reduce the range of possible leaf angles and so reduces ambiguity and discriminates against false-positive edges in the video image.

The visibility constraint model uses a model of the specific physical appearance of the book, and this described below with reference to FIG. 6.

Figure 6:
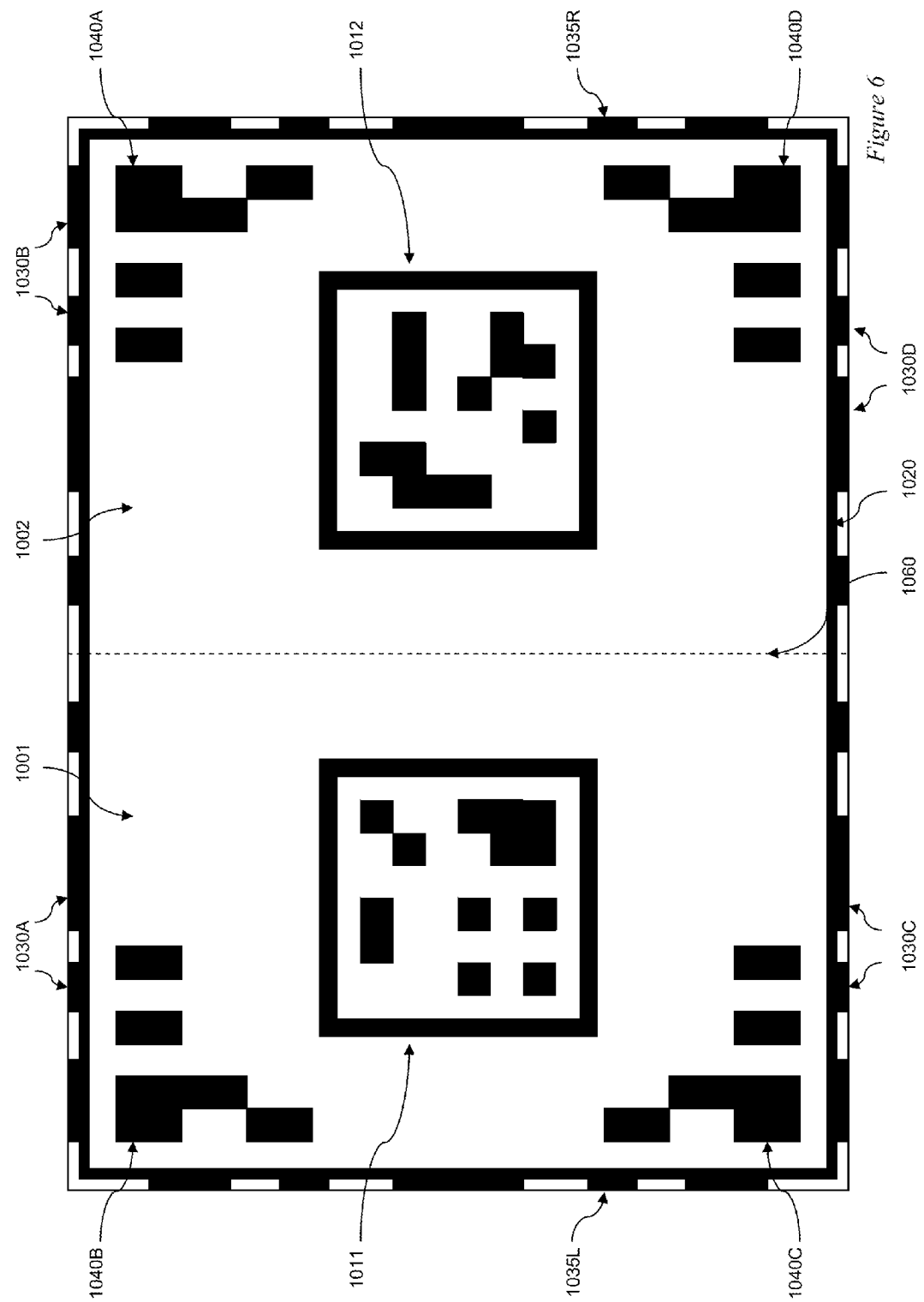
FIG. 6 is a schematic diagram of a two-page spread of a book, in accordance with an embodiment of the present invention.

As illustrated in FIG. 6, in an embodiment of the present invention each page (1001, 1002, etc.) comprises at least one respective fiduciary marker (1011, 1012) positioned substantially in the middle of the page, as described previously.

The middle may be considered to be an area of the page a predetermined distance from the outside edges of the page, the predetermined distance lying for example in the range 4 centimetres to 10 centimetres for a typical A4 size book. The purpose of this spacing is to reduce the scope for fingers or thumbs to occlude some or all of the fiduciary marker when holding the book in normal use; hence more generally the predetermined distance may be the average length of the thumb of a user amongst the target audience for the book. As result, if it is desired to maximise the size of the fiduciary marker within this middle area, then assuming that the marker is either square or a quadrilateral with an aspect ratio similar to that of the pages, it is preferable to orient it substantially in alignment with the edges of the page.

The fiduciary markers may therefore be positioned exactly centrally with respect to a page, or, in an embodiment of the present invention are offset laterally toward the spine of the book 1060 (which lays between opposing pages when the book is fully open and flat). In this case the offset may typically be in the order of 1 to 5 cm, though other offsets may be envisaged depending on the size of the book.

Each fiduciary marker on these pages comprises a different respective asymmetric pattern capable firstly of indicating the scale and orientation of the book to an augmented reality application, as described above, and secondly of indicating the respective page (i.e. which page of the book it is). It will be appreciated that an augmented reality application operable with the book will hold reference or template copies of each fiduciary marker, and that each marker will be associated with a particular page of the book. Consequently identification of a marker also to identifies the page it is printed on or attached to.

In addition, on each page a non-alphanumeric pattern (1040A, 1040B) is positioned closer to an outside edge of the page of the book than the fiduciary marker. Typically, this non-alphanumeric pattern is positioned between the fiduciary marker and the edge of the page that, in normal use, is furthest from the user of the book. This edge is thus also closest to the video camera for the most typical usage of the book, in which the video camera is positioned close to the TV on which the augmented images are to be displayed, and the user is facing the TV. The non-alphanumeric pattern can similarly be positioned between a corner of the fiduciary marker and the corner of the page formed by the further page edge from the user and the lateral outside page edge (the left or right outside page edge, depending on the page), as illustrated in FIG. 6.

Notably, the non-alphanumeric pattern can thus form an 'L' shape (i.e. follow the outer edge of the book around the corner). In this case the non-alphanumeric pattern is therefore positioned closer to both edges than the fiduciary marker.

This non-alphanumeric pattern is capable in principle of indicating at least the opposing page pair (e.g. pages 1 and 2 as illustrated in FIG. 6) comprising the respective page on which the non-alphanumeric pattern is positioned. Hence in the illustrated example, the non-alphanumeric pattern is unique to the pair of pages 1 and 2. Optionally, the non-alphanumeric pattern could be unique to a single page, but this could potentially require a more complex pattern as it doubles the number of unique patterns required in the book.

Because of its position closer to the edge of the book, the non-alphanumeric pattern of a given page is revealed earlier in the process of turning the leaf or leaves above it. This allows appropriate augmentation of the page as it is revealed before it is identified using the centrally positioned fiduciary marker.

Notably, unlike the fiduciary marker, the non-alphanumeric pattern is not needed to initially determine the position, scale or orientation of the book. As a result the non-alphanumeric pattern can in principle be ambiguous in terms of scale or orientation, as these aspects of the pattern can be resolved with reference to the fiduciary markers in the book.

Instead, the non-alphanumeric pattern relies on disambiguation of its scale and orientation by reference to a visible fiduciary marker. For example, referring back to FIG. 4, if a non-alphanumeric pattern was revealed in the corner of page 6 (reference no 1006 in FIG. 4) then its scale and orientation may be determined by reference to the fiduciary marker 1011 on page 1 in the illustrated example, and also any optional book tracking algorithm based upon the page edges 1020.

Notably therefore the non-alphanumeric pattern can be arranged on opposing pages as a minor image about the spine of the book as shown in FIG. 6 to appear more pleasing to the user, without affecting its functionality.

It will be appreciated that the non-alphanumeric pattern can also be mirrored about a centre line between the two outside edges of the page (i.e. the top and bottom edges, as the left or right edge does not have a corresponding opposite outside edge but instead ends at the spine).

Consequently a two-page spread may have four copies of the same non-alphanumeric pattern 1040A-D, each rotated by 90 degrees to another, and having a rotational symmetry about the midpoint of the spine of the book.

This means that if the user of the book holds it upside-down, a copy of the non-alphanumeric pattern will still be visible to the camera for the purpose of early indication of the newly revealed page(s).

In addition to the markings on the leaves of the book, in an embodiment of the present invention the book has a cover having larger dimensions than the leaves of the book, and hence having extremities that extend beyond the outer edges of each page when viewed from above as in FIG. 6.

The cover comprises a high contrast pattern along at least a first such extremity (1030A). It will be appreciated that the pattern is thus printed on the inside cover at and near to the outer edge of the cover.

As with the non-alphanumeric pattern, the pattern may be mirrored about the spine (and hence appear on the inside front and back covers) and may also be mirrored about a centreline between the top and bottom of the pages, to form four copies of the high contrast pattern (1030A-D).

The pattern may encode information about the book (for example a title number) or may simply be random. A typical high contrast pattern may encode in the order of 6 to 20 bits. The light and dark elements of the pattern may adhere to a regular spacing scheme or have arbitrary spacing.

In addition, a high contrast pattern (1035L,R) may also be positioned along the lateral extremities of the book. This high contrast pattern may be the same as the high contrast pattern mentioned above, or may encode the same information in a different way, or encode different or additional information, or be random.

In any of the above cases, it will be appreciated that the covers have a predetermined thickness. Consequently, in an embodiment of the present invention, the high contrast pattern extends over the edge of the cover and across at least a predetermined proportion of the thickness of the cover, to improve its visibility at very acute angles with respect to the video camera.

Turning back now also to FIGS. 3 and 5, in an embodiment of the present invention the Cell processor under suitable software instruction implements the visibility constraint model for the hypothesised range of positions of the turning leaf based upon potentially visible features of the book such as those described above.

The Cell processor can estimate the current position and orientation of the book (i.e. its 'pose') with respect to the video camera using a visible fiduciary marker on a page of the book, and/or a book tracking algorithm that estimates the current book state for example from the page edge marking 1020 and/or the high contrast pattern 1030(A-D), 1035(L,R) on the book cover extremities.

The Cell processor also has access to a set of constraints on the book's motion (i.e. the book's degrees of freedom); for example that leaves can only rotate about the axis of the spine.

Furthermore, as noted above the Cell processor has access to an appearance model of the book on each page; that is to say, the cell processor can retrieve and/or calculate, as applicable, the location and appearance of each marking on a given page of the book.

Combining this appearance model with the estimated scale and orientation of the book with respect to the video camera based upon the detected fiduciary marker, the Cell processor can therefore compute the expected position and orientation of the other markings of the book in the captured video image.

Therefore in principle, given an angle of rotation of a turning leaf of a book, the Cell processor could calculate which of these markings would be visible for the current position and orientation of the book.

Notably, this relationship between the visibility of expected markings and the angle of rotation of a leaf of the book can then be used in reverse—that is to say, given an estimated position and orientation of the book, and given confirmation of certain markings as being visible for that estimated position and orientation, the Cell processor can constrain the range of possible page angles of a turning leaf to those at which these markings should be visible, using its appearance model and motion constraint model.

Figure 7A:
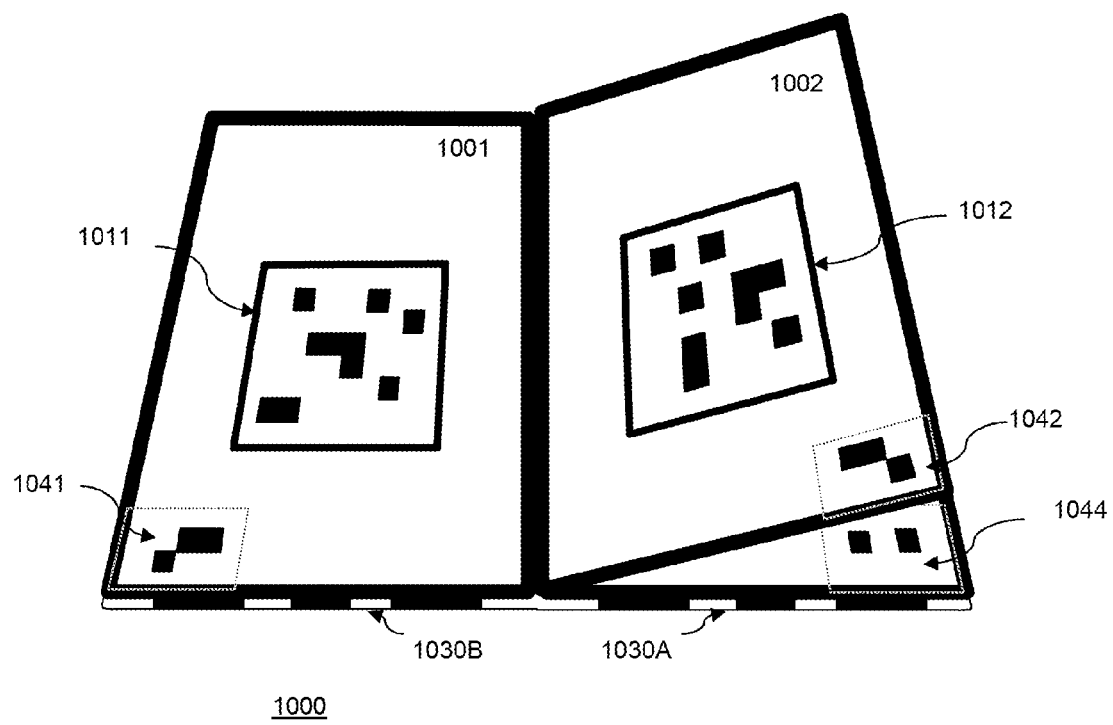
FIG. 7A is a schematic diagram of a book having a leaf turned to a first position, in accordance with an embodiment of the present invention.
Figure 7B:
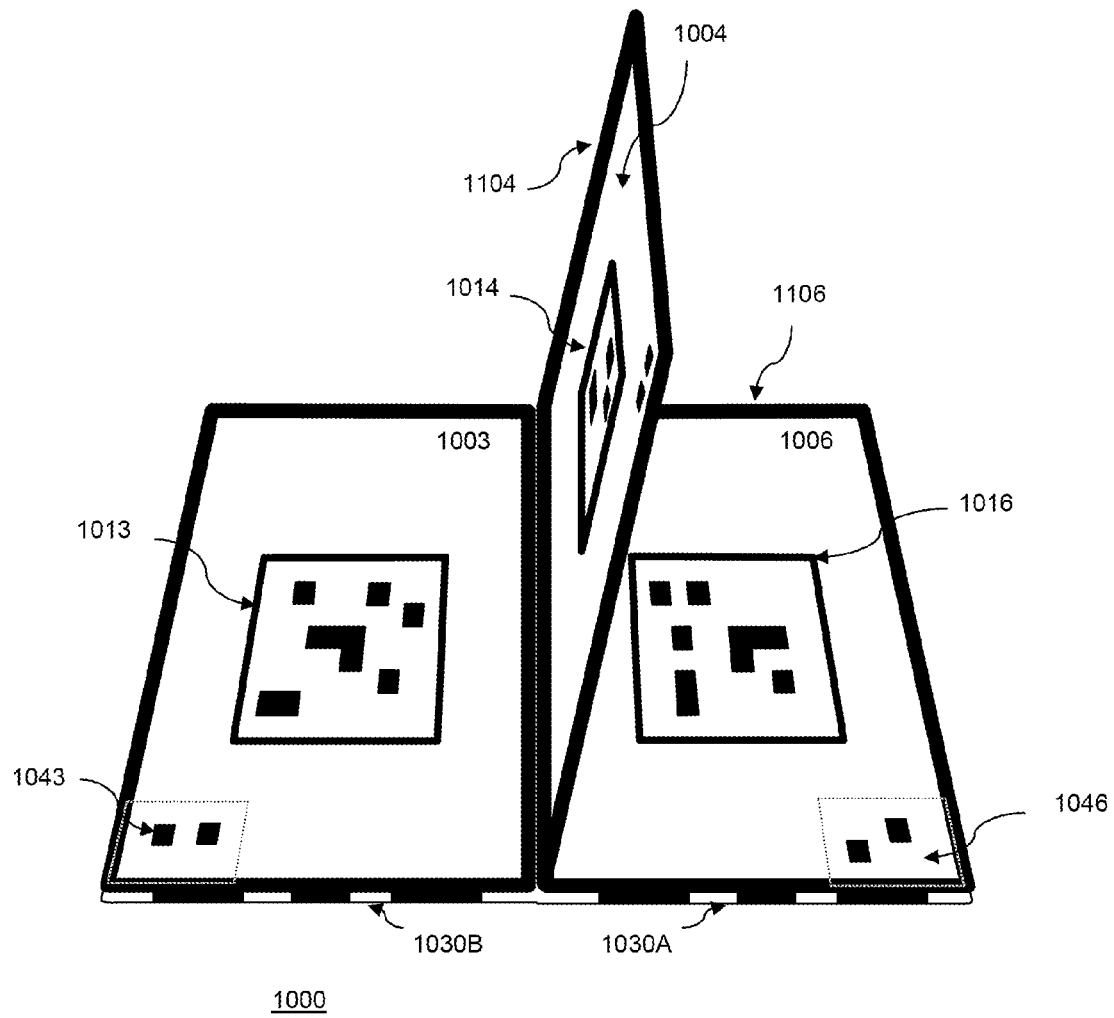
FIG. 7B is a schematic diagram of a book having a leaf turned to a second position, in accordance with an embodiment of the present invention.

Referring now to FIGS. 7A and 7B, by way of example two leaves are shown at different stages of rotation about the spine of the book.

Taking leaf 1102 in FIG. 7A first, it can be seen that this leaf is identified using the fiduciary markers 1011, 1012 on pages 1 and 2 (1001 and 1001) of the book. At this stage it is possible that the angle of the turning leaf of the book can be estimated from the resulting distortions of the fiduciary marker in the captured image of the book as compared with a to reference template of the marker held in the PS3's memory.

However, alternatively or in addition (for example if the book is relatively small in the video image, or glare is making the fiduciary marker on page 2 hard to resolve), the above page turning estimation technique may be used, and modified according to the above visibility constraint model.

In this case, the non-alphanumeric marker 1044 of the following page pair is detectable, but the fiduciary marker 1014 on the following page is not.

For the current position and orientation of the book, this means that the turning page is likely to lie in the range 15 to 75 degrees, where 0 degrees is horizontal (flat on the book) and 90 degrees is vertical (perpendicular to the book), about the axis of the spine of the book.

If the non-alphanumeric marker of the following page had not been detectable, then the turning page would be likely to lie in the range 0 to 15 degrees.

Similarly, taking leaf 1104 in FIG. 7B as a second example, it can be seen that the identity of this leaf can be estimated using the fiduciary marker 1013 on page 3 (1003) of the book. At this stage of rotation it is unlikely that the fiduciary marker 1014 on page 4 (1004) of the book can be resolved directly, and so the system is dependent primarily on the above technique of FIG. 5 to estimate the position of the turning leaf.

In this case, both the non-alphanumeric marker 1046 and fiduciary marker 1016 of the following page 6 (1006) are detectable, and as noted above the fiduciary marker 1013 on page 3 of the book is also visible.

For the current position and orientation of the book, this means that the turning page is likely to lie in the range 75 to 105 degrees.

It will be appreciated that as a leaf completes the second half of the turn, fiduciary markers and non-alphanumeric markers on the page now being successively covered by the leaf can be similarly used by the visibility constraint model to estimate the likely range of angles of the turning leaf, and that more generally any salient markings of the book may be used at any time.

Figure 8A:
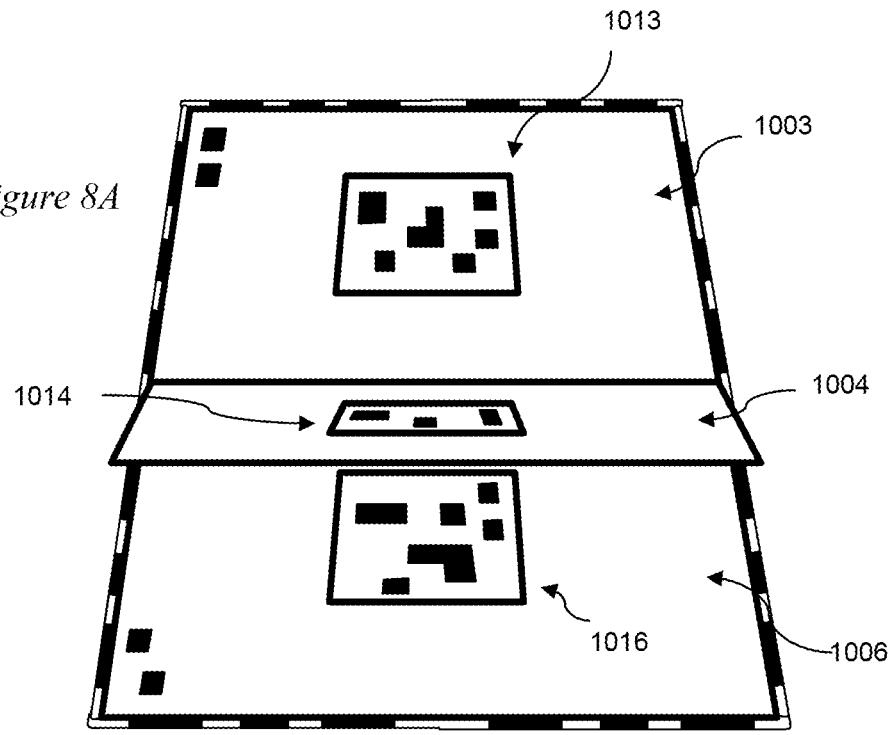
FIG. 8A is a schematic diagram of a book having a leaf turned to a first position, in accordance with an embodiment of the present invention.
Figure 8B:
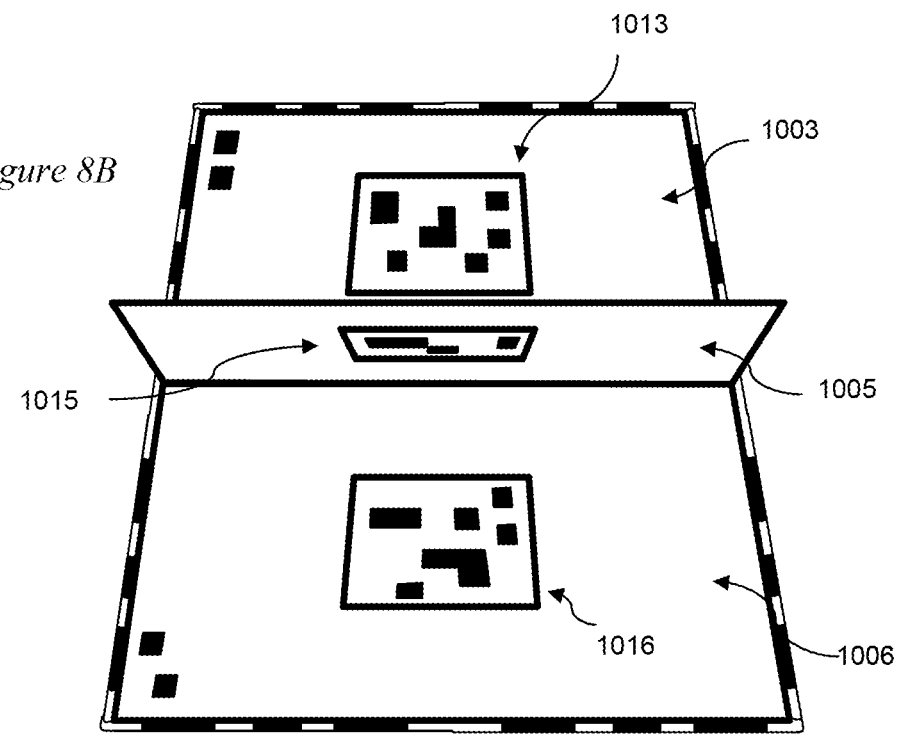
FIG. 8B is a schematic diagram of a book having a leaf turned to a second position, in accordance with an embodiment of the present invention.

Turning now also to FIGS. 8A and 8B, these illustrate the significance of the estimated position and orientation of the book with respect to the visibility constraint model. FIGS. 8A and 8B also illustrate stages in the turning of leaf 1104, previously shown in FIG. 7B. In FIG. 7B is was noted that the visibility of fiduciary markers 1013 and 1016 meant that for the position and orientation of the book seen in FIG. 7B, the angle of the leaf was likely to lie in the range 75 to 105 degrees. However, for the position and orientation shown in FIGS. 8A and 8B, it can be seen that the visibility of fiduciary markers 1013 and 1016 means that the angle of the leaf is to likely to lie in the range of 40 to 60 degrees.

Hence the visibility constraint model takes account of the expected appearance of the pages of the book, and the position and orientation of the book with respect to the video camera, as computed with reference to a detected fiduciary marker, when estimating the likely range of angles of a currently turning leaf.

This estimated likely range of angles may then be used to modify the page turning estimation method of FIG. 5 in one or more of the following ways.

Firstly, the range of hypotheses implemented may be reduced in response to the likely range. For example, rather than implementing a range of hypotheses between 10 degrees and 170 degrees in 4 degree steps (for example), a range of hypothesis between 30 and 70 degrees may be implemented in 2 degree steps (for example in response to the view shown in FIG. 8A or 8B, indicating a range of 40 to 60 degrees).

Thus in a first embodiment, the range of hypotheses may be at least initially limited to the likely range of angles returned by the visibility constraint model, optionally plus a predetermined additional buffer range (in the example above, an extra 10 degrees on either side of the likely range). In addition, because the range is smaller, optionally hypotheses in it can be implemented at smaller increments (for example 2 degrees rather than 4) for the same overall computational overhead, so improving the fidelity of the eventual position estimate.

If a candidate page match is not found within this reduced range that meets a target threshold score, then either hypotheses for a broader range of angles may be used, or a failure mode may be used. For example, in a failure mode the position of the turning leaf may instead be extrapolated from the angular velocity of the page computed from the change in leaf angle observed over the last N video frames. This may give a reasonable approximation despite the lack of direct estimation of the leaf position from the image data for the current frame.

Secondly, alternatively or in addition, the scores awarded to hypotheses may be weighted according to whether they lie within the likely range identified by the visibility constraint model. Taken alone, this maintains the full range of hypotheses whilst prejudicing against false-positives and other outliers, for example caused by shadows or elements of the background beyond the book. In conjunction with the first technique above, it can be used to help resolve a most likely page position where there are multiple partial edges within the range, for example due to motion blur.

It will be appreciated that in either case the weighting may be a function of visibility evidence from multiple aspects of the book. Thus for example, the visibility of fiduciary markers to 1013 and 1016 are evidence that the turning leaf lies between 40 and 60 degrees for the current position and orientation of the book, but the visibility constraint model may also comprise rules for the sizes and angles at which recognition of a fiduciary marker fails, and hence also treat the inability to identify marker 1014 at this position and orientation as evidence that the turning leaf lies at an angle of 50 degrees or more.

Hence in this example the weighting will be highest in the range 60-50 degrees, high between 50 and 40 degrees, lower in any predetermined buffer region (for example between 70-60 and 40-30 degrees) and lower still outside these ranges.

In the above description, reference to the visibility of markings has assumed that the marking is fully visible (or visible to the extent that it can be positively identified by the PS3). However, in an embodiment of the present invention, the PS3 is not limited to whether or not a non-alphanumeric pattern or fiduciary marker is fully recognised in order to estimate the range of angles of the turning leaf.

Recall that the PS3 can access and/or compute the expected appearance of the book for a given position and orientation; consequently it is possible to estimate what proportion of an expected pattern is visible without subjecting that pattern to the rigour of positive identification.

Figure 9A:
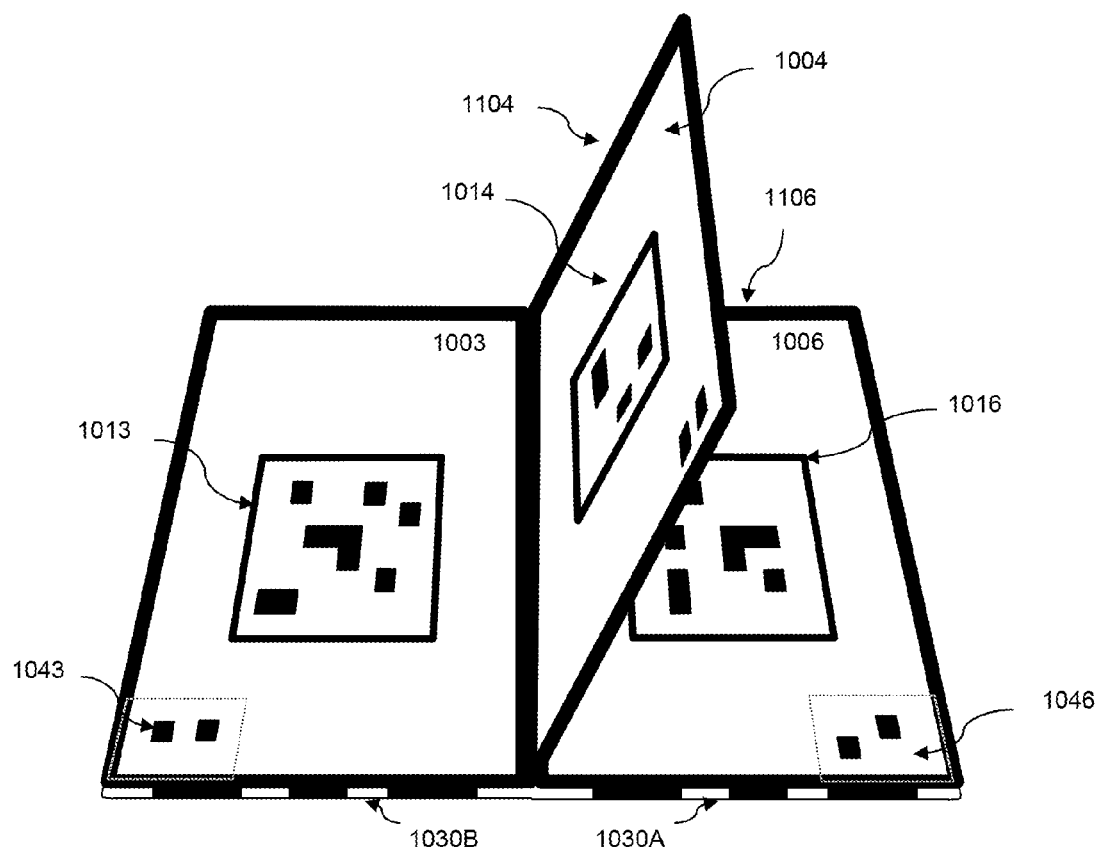
FIG. 9A is a schematic diagram of a book having a leaf turned to an illustrative position, in accordance with an embodiment of the present invention.
Figure 9B:
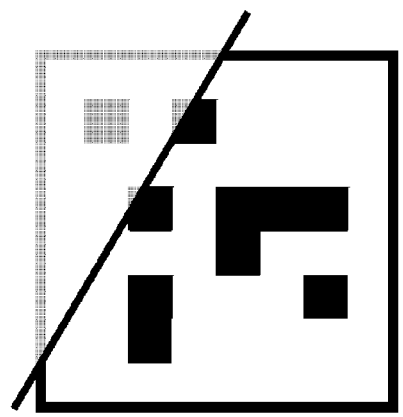
FIG. 9B is a schematic diagram of a projection of a feature of the book from an image of the book, in accordance with an embodiment of the present invention.

Hence referring now also to FIGS. 9A and 9B, in FIG. 9A the turning leaf is partially occluding the fiduciary marker 1016 on page 6 (1006). In this case the marker may not be recognised with sufficient rigour or certainty to act as a basis for estimating the scale and orientation of the book (though this can still be done using marker 1013), but the expected fiduciary marker pattern on this page can be compared with the image from the video to provide a rough estimate of how much of the marker is visible and hence a more exact estimation of the position of the edge of the turning leaf—from which the likely range of angles of the turning leaf can be refined or further weighted in conjunction with the position and orientation of the book, as described previously.

Hence referring to FIG. 9B, the captured image (corrected for the currently estimated position and orientation of the book) can be compared with the reference template for the fiduciary marker using known template matching techniques, and the extent of the partial match can be identified. In this case, the amount of the fiduciary marker currently visible is consistent with the angle of the turning leaf being between 60 and 65 degrees, for the illustrated position and orientation of the book.

In addition, it will be appreciated that this approach can also be applied to the non-alphanumeric patterns themselves. The system can assume that if the non-alphanumeric pattern of a subsequent page has been identified but the fiduciary marker has not yet been formally to identified, then the partial pattern matching process can be applied to the fiduciary marker. However, if the non-alphanumeric pattern of a subsequent page has not yet been formally identified then the partial pattern matching process can be applied to the non-alphanumeric pattern. Hence the partial pattern matching process can be applied to the next expected but as yet unconfirmed feature of the book in turn as the leaf reveals them.

In this case, to account for the possibility that more than one leaf is being turned at the same time (such that the revealed page is not immediately known) then it will be appreciated that the pattern matching process can be applied to the reference non-alphanumeric patterns for successive pages of the book until a match satisfying a threshold value is reached. However in either event if no reliable match is found then this additional evidence is not factored into the visibility constraint model.

Hence in a summary embodiment of the present invention, an entertainment device such as the PS3 10 comprises a video input such as a USB port 710 or wireless link (730, 740) operable to receive a video image comprising a book. A processor such as the Cell processor 100 is then arranged in operation (i.e. under suitable software instruction) to estimate the current position and orientation of the book within the video image in response to a fiduciary marker of the book visible in the image, as described previously. Likewise a processor such as the Cell processor (either acting as a whole unit, or assigning tasks to individual cores) is arranged in operation to estimate the visibility of one or more predetermined features of the book, as described previously. A processor (again the Cell processor as a whole or a respective core) is arranged in operation to calculate a range of leaf turning angles that is consistent with the detected visibility of the or each predetermined feature of the book for the estimated current position and orientation of the book, as described previously, and then a processor (again the Cell processor as a whole or a respective core) is arranged in operation to estimate the angle of a turning leaf of the book responsive to the calculated range.

Such an entertainment device may form part of a system for book leaf tracking when operably coupled to a video camera 756 such as the EyeToy® or PlayStation Eye®.

This system may then comprise one or more books 1000, the or each book comprising one or more turnable leaves having pages on which are printed a fiduciary marker (800, 1011, 1012, etc.), as described previously.

Also as described previously, the or each book may also comprise at least a first instance of a non-alphanumeric pattern disposed between the fiduciary marker and an outside edge of the page.

Figure 10:
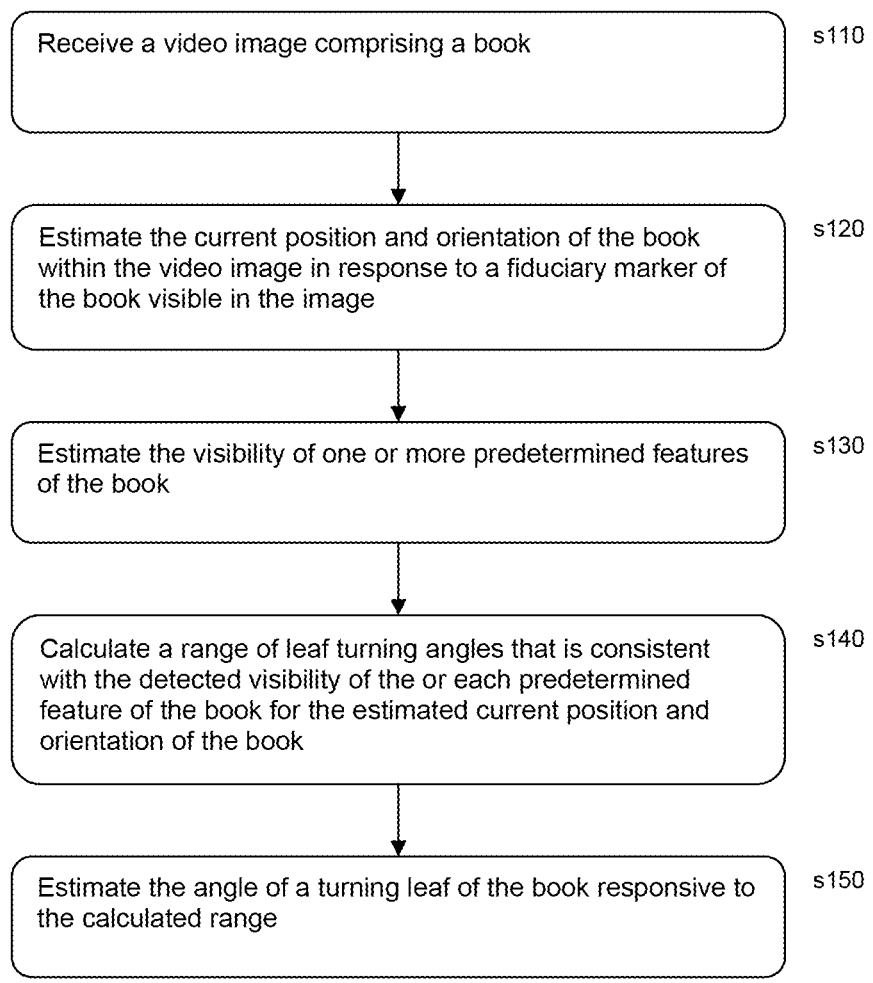
FIG. 10 is a flow diagram of a method of tracking the turning of a leaf of the book, in accordance with an embodiment of the present invention.

Referring now also to FIG. 10, in light of the above description, in an embodiment of to the present invention a method of book leaf tracking comprises:

in a first step s110, receiving a video image comprising a book;

in a second step s120, estimating the current position and orientation of the book within the video image in response to a fiduciary marker of the book visible in the image;

in a third step s130, estimating the visibility of one or more predetermined features of the book;

in a fourth step s140, calculating a range of leaf turning angles that is consistent with the detected visibility of the or each predetermined feature of the book for the estimated current position and orientation of the book; and in a fifth step s150, estimating the angle of a turning leaf of the book responsive to the calculated range.

It will be apparent to a person skilled in the art that variations in the above method corresponding to operation of the various embodiments of the apparatus as described and claimed herein are considered within the scope of the present invention, including but not limited to:

The step of estimating the angle of a turning leaf of the book comprising the steps of hypothesising a plurality of possible positions for at least a first detectable edge of a turning leaf, comparing the hypotheses with one or more detected edges from some or all of the image and selecting as the estimated angle that of the hypothesis that compares most favourably with the or each detected edge.

Wherein the range of hypothesised possible positions is constrained responsive to the calculated range, and/or the comparison of hypotheses with detected edges is weighted responsive to the calculated range.

The step of estimating the visibility of one or more predetermined features of the book comprising detecting the complete visibility of the or each predetermined feature, or The step of estimating the visibility of one or more predetermined features of the book comprises detecting the whether the or each predetermined feature is recognisable to a predetermined confidence level, or The step of estimating the visibility of one or more predetermined features of the book comprising detecting the extent to which the or each predetermined feature is visible.

Wherein the estimation comprises the steps of correcting for the orientation and scale of the or each predetermined feature, and comparing the or each corrected to predetermined feature with a respective reference version of that predetermined feature to estimate the extent of the predetermined feature that is visible in the image.

As noted previously, different evidence may become available at different times (for example when a fiduciary marker is visible but can no longer be reliably recognised), and so the visibility constraint model can add new constraint elements as they become available or add relevant constraints (e.g. narrowing the likely range further).

The predetermined feature being one or more of a fiduciary marker, a non-alphanumeric marker, a high contrast pattern applied to the visible extremities of the inside covers, or any salient feature of the book resolvable in an image of the book in normal use.

In the case of the non-alphanumeric marker, its scale and orientation can be estimated with reference to a fiduciary marker visible on a different page to the non-alphanumeric marker.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A method of book leaf tracking, comprising:
   receiving a video image comprising a book;
   estimating a current position and orientation of the book within the video image in response to a fiduciary marker of the book visible in the video image;
   estimating a position and orientation of one or more predetermined markings of the book within the video image in response to the estimated current position and orientation of the book and based on a known physical relationship between the one or more predetermined markings and a leaf of the book;
   detecting visibility of the one or more predetermined markings of the book at each respective estimated position and orientation thereof;
   calculating a range of hypothetical leaf turning angles that is constrained in accordance with the estimated visibility of at least one of the predetermined markings of the book at the estimated position and orientation of the at least one predetermined marking for the estimated current position and orientation of the book; and
   estimating an angle of a turning leaf of the book responsive to the calculated range.

2. The method of claim 1, in which the step of estimating the angle of the turning leaf of the book comprises the steps of:
   hypothesising a plurality of possible positions for at least a first detectable edge of the turning leaf;
   comparing the hypotheses with one or more detected edges from at least a portion of the video image; and
   selecting as the estimated angle that of the hypothesis that compares most favourably with one or more of the detected edges.

3. The method of claim 2, in which a range of hypothesised possible positions is constrained responsive to the calculated range.

4. The method of claim 2, in which the comparison of hypotheses with detected edges is weighted responsive to the calculated range.

5. A method according to claim 1, in which the step of estimating the visibility of one or more predetermined markings of the book comprises detecting a complete visibility of the one or more predetermined markings.

6. A method according to claim 1, in which the step of estimating the visibility of one or more predetermined markings of the book comprises detecting whether at least one of the predetermined markings is recognisable to a predetermined confidence level.

7. A method according to claim 1, in which the step of estimating the visibility of one or more predetermined markings of the book comprises detecting an extent to which at least one of the predetermined markings is visible.

8. The method of claim 7, in which the step of estimating the visibility of one or more predetermined markings of the book comprises the steps of:
   correcting for an orientation and scale of at least one of the predetermined markings; and
   comparing at least one of the corrected predetermined markings with a respective reference version of that predetermined marking to estimate the extent of the predetermined marking that is visible in the image.

9. A method according to claim 1 in which at least one of the one or more predetermined markings is a fiduciary marker.

10. A method according to claim 1 in which at least one of the one or more predetermined markings is a non-alphanumeric marker.

11. A non-transitory computer program product comprising computer program instructions that when performed by a processor implement a method comprising the steps of:
    receiving a video image comprising a book;
    estimating a current position and orientation of the book within the video image in response to a fiduciary marker of the book visible in the video image;
    estimating a position and orientation of one or more predetermined markings of the book within the video image in response to the estimated current position and orientation of the book and based on a known physical relationship between the one or more predetermined markings and a leaf of the book;
    detecting visibility of the one or more predetermined markings of the book at each respective estimated position and orientation thereof;
    calculating a range of hypothetical leaf turning angles that is constrained in accordance with the estimated markings of at least one of the predetermined features of the book at the estimated position and orientation of the at least one predetermined marking for the estimated current position and orientation of the book; and
    estimating an angle of a turning leaf of the book responsive to the calculated range.

12. An entertainment device, comprising:
    a video input operable to receive a video image comprising a book;
    a processor configured to estimate a current position and orientation of the book within the video image in response to a fiduciary marker of the book visible in the video image;
    a processor configured to estimate a position and orientation of one or more predetermined markings of the book within the video image in response to the estimated current position and orientation of the book and based on a known physical relationship between the one or more predetermined markings and a leaf of the book;
    a processor configured to detect visibility of the one or more predetermined markings of the book at each respective estimated position and orientation thereof;
    a processor configured to calculate a range of hypothetical leaf turning angles that is constrained in accordance with the estimated visibility of at least one of the predetermined markings of the book at the estimated position and orientation of the at least one predetermined marking for the estimated current position and orientation of the book; and a processor configured to estimate an angle of a turning leaf of the book responsive to the calculated range.

13. A system for book leaf tracking, comprising:
the entertainment device of claim 12; and
a video camera operably coupled to the entertainment device.

14. The system of claim 13, comprising:
a book comprising one or more turnable leaves, upon the pages of which are printed a respective fiduciary marker.

15. The system of claim 14, in which the pages comprise at least a first instance of a non-alphanumeric pattern disposed between the fiduciary marker and an outside edge of the page.

16. The entertainment device of claim 12, wherein the processor configured to estimate the current position and orientation of the book, the processor configured to estimate a position and orientation of one or more predetermined markings of the book within the video image, the processor configured to detect visibility of the one or more predetermined markings of the book, the processor configured to calculate a range of hypothetical leaf turning angles, and the processor configured to estimate an angle of a turning leaf of the book responsive to the calculated range are comprised of a single processor device.

* * * * *